Figure 1:
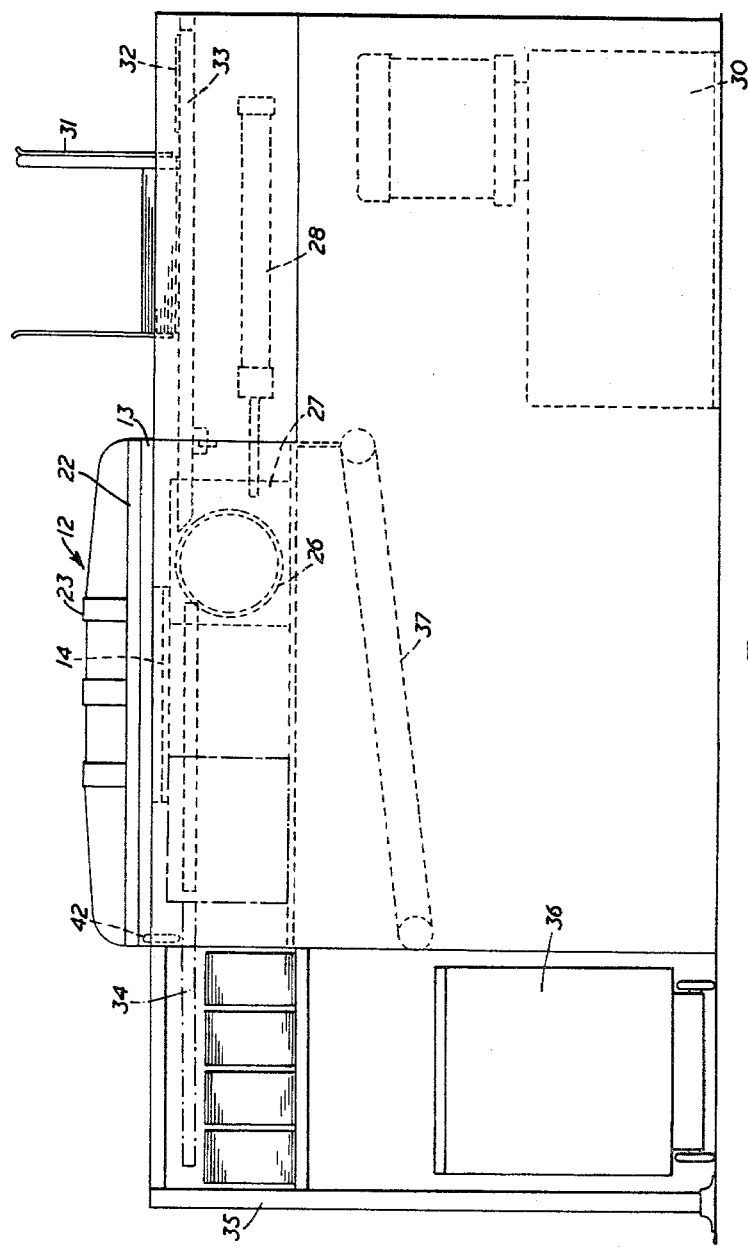

May 4, 1965 W. E. WALKER 3,181,404
CUTTING MACHINES
Filed Jan. 8, 1963 5 Sheets-Sheet 1

INVENTOR
W. E. Walker
BY
Holcombe, Wetherill & Brisbois
ATTORNEY

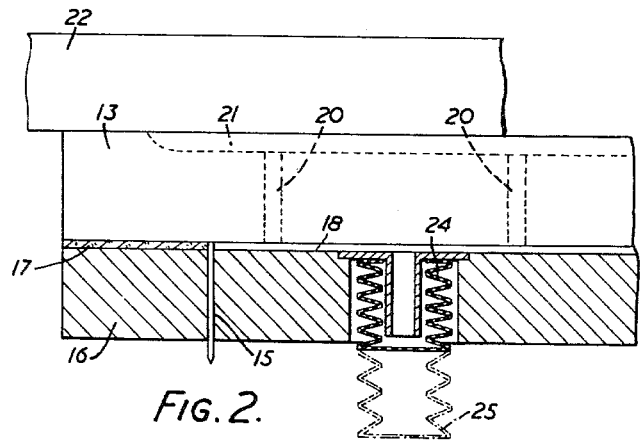
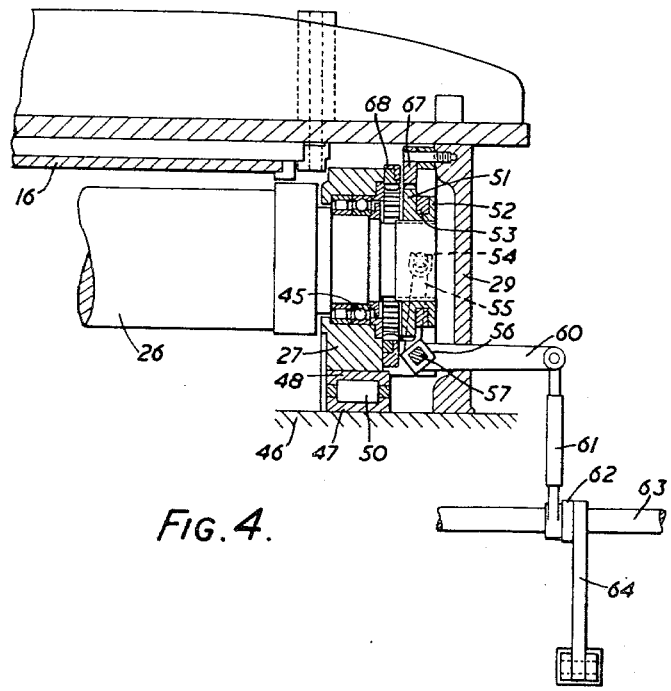

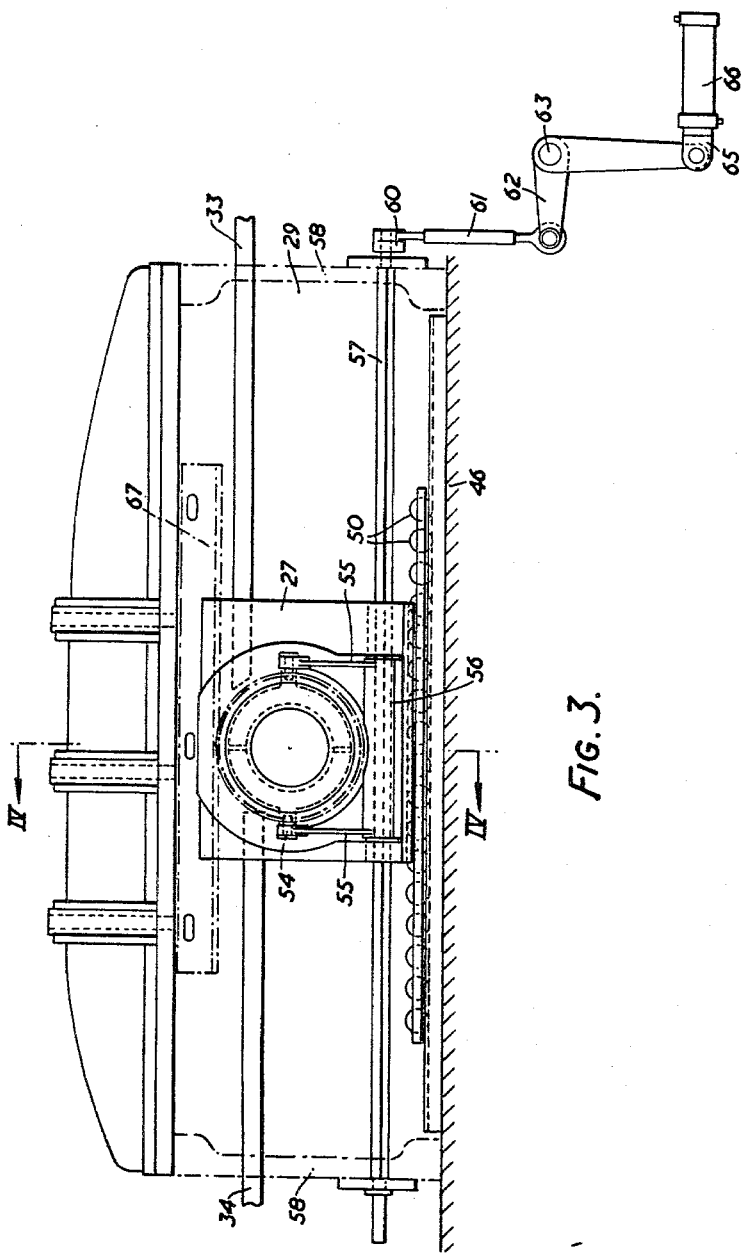

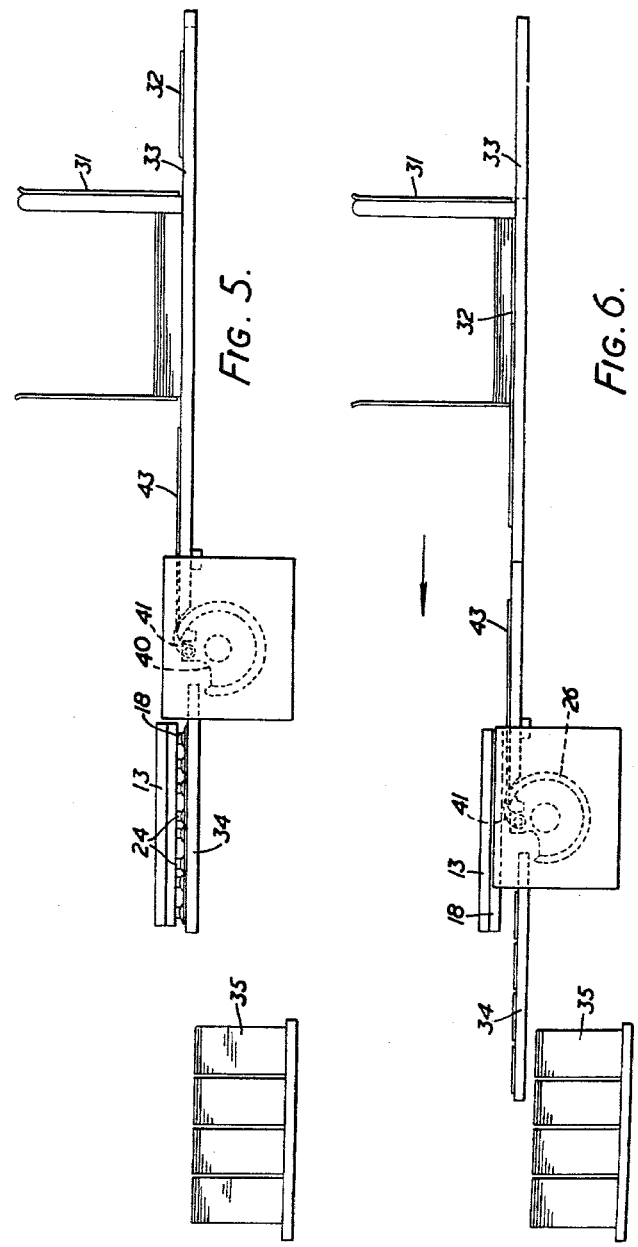

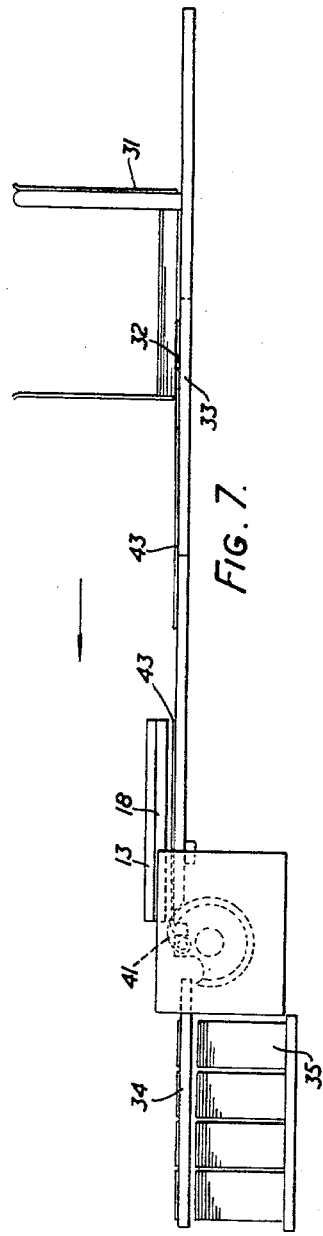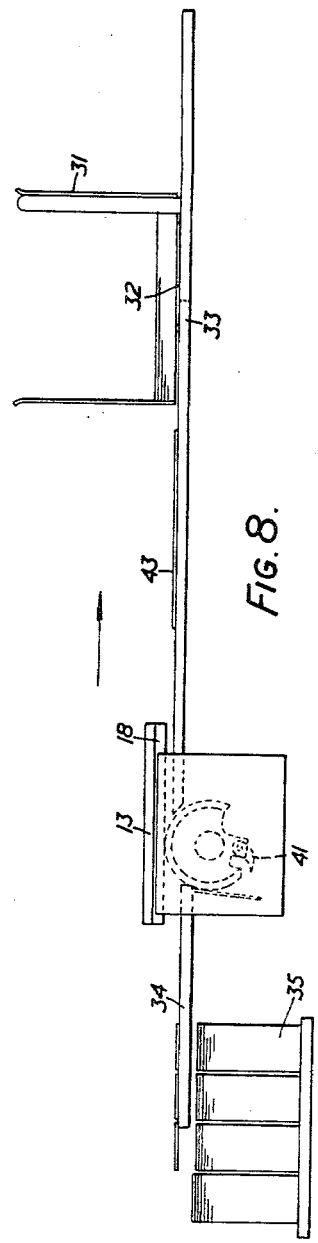

United States Patent Office 3,181,404
Patented May 4, 1965

3,181,404
CUTTING MACHINES
William Edward Walker, Stansted, England, assignor to Walker (Enfield) Limited, Enfield, England
Filed Jan. 8, 1963, Ser. No. 250,151
Claims priority, application Great Britain, Jan. 8, 1962, 655/62
14 Claims. (Cl. 83—98)

This invention relates to cutting machines and, in particular, to machines which either cut, or cut and crease, thick paper or cardboard blanks, in order that those blanks may be made in to cartons or the like. In such a machine, the blank is forced against a carefully prepared forme or die which cuts through the blank to form the required shape for the carton, and may also form crease lines in the blank to assist subsequent carton formation.

One of the difficulties that has been experienced with such machines is the removal of unwanted material which is to be removed from the blank after the cutting operation. Previously, it has been necessary to remove the unwanted material by hand, or by the use of a machine additional to the cutting machine.

A cutting machine for sheet material comprises according to the present invention a forme or cutting die and means for forcing the material against the forme causing cutting of the material, the arrangement being such that in operation the waste and wanted parts of the cut material are removed from the forme at different times. In this way cutting, and removal of the waste may be effected automatically in the same machine.

Preferably, the cutting machine comprises a stationary forme or cutting die, a cylinder movable over the forme to roll the material on to the forme and cause cutting of the die, means movable with the cylinder for removing waste material from the forme, the wanted material being retained on the forme, a delivery device for receiving the wanted material, and means for removing the wanted material from the forme and on to the delivery device.

The invention will be more readily understood by way of example from the following description of a cutting and creasing machine in accordance therewith, reference being made to the accompanying drawings, in which FIGURE 1 is a side view of the machine, FIGURE 2 is a sectional view on enlarged scale, illustrating the ejection mechanism of the cutting forme, FIGURE 3 is a side view, on enlarged scale, of the cutting cylinder, the side plate being removed, FIGURE 4 is a part-section on the line IV—IV of FIGURE 3, showing one end of the cylinder, FIGURES 5 to 8 illustrate successive stages in the operation of the cutting and creasing machine.

The cutting and creasing machine comprises a stationary member 12 consisting of a horizontal backing platen 13 with a cutting and creasing forme 14 secured to its lower face. The forme 14, as shown in FIGURE 2, consists of cutting blades 15 which are arranged to cut, and form crease lines, in the required disposition in carton or like blanks, and which protrude downwardly from a wooden plate 16. Interposed between the plate 16 and the platen 13 is a sheet of cork 17 or similar resilient material which is cut away over those parts of the forme corresponding to the wanted portion of the cut blank, as at 18, and the cut away parts 18 communicate through passages 20 in the platen 13 with a manifold 21 formed in the upper surface of the platen 13 and closed by a top plate 22. The manifold 21 is connected to pipes connected to a source of air under pressure (not shown).

Located between the blades 15 and arranged over the wanted portion of the cut blanks are a number of metal bellows 24 opening to the cut away parts 18. Normally, the lower end of each bellows is above the extremities of the blades but, when pressure is applied, the bellows are expanded as shown in chain line at 25 and protrude below the blades 15.

A cylinder 26 is employed to force each carton blank against the forme. This cylinder 26 extends over the width of the forme and is carried between a pair of blocks, one of which is shown at 27. The blocks 27 and cylinder 26 are reciprocated horizontally below the forme 14 and between a pair of side plates 29 by a hydraulic ram 28 energised by a hydraulic unit 30, as will be described hereinafter.

A feed hopper 31 for blanks to be cut is located on the feed side of the forme 14. A feed pusher 32 which, one each reciprocation of the cylinder 26, pushes the lowermost blank out of the feeder 31 is carried on a feed support 33 secured to the blocks 27 of the cylinder 26 and projecting backwardly on the feed side of that structure under the feed hopper 31.

At the forward or delivery side, the blocks 27 carry a delivery support 34. When the cylinder 26 is in its forward position, the delivery support 34 overlies a hopper 35 for cut and creased blanks, while a bin 36 for waste is located beneath hopper 35. A waste conveyor 37 is arranged below the platen 22 to deliver waste material to the bin 36.

The cylinder 26 has generally a circular cross-section but has an axially extending sector 40 removed from it. In this sector are located pivoted gripper fingers 41 which do not extend proud of the cylinder; these gripper fingers 41 are designed to grip each blank by the leading edge and to feed it below the forme so that it may subsequently be cut by the forme blades 15. The line of travel of the cylinder is chosen so that, when the sector 40 is uppermost, the periphery of the cylinder is separated from the lower surface of the blades 15 by a small clearance. However, when the cylinder turns so as to present the cylindrical surface to the blades, the clearance between the blades and the cylinder is reduced substantially to zero, as indicated in FIGURE 8. The effective peripheral distance round the cylinder between the edges of the sector 40 is chosen to be somewhat greater than the length of the forme in the direction of movement of the cylinder.

Turning to FIGURES 3 and 4, each end of cylinder 26 is carried in bearings 45 in one of the blocks 27, which in turn are supported on roller tracks on the bed plate 46. Each such track consists of a guide channel 47 which is secured to the bed plate 46 and a similar, but inverted, guide channel 48 on the lower face of the block 27, with a series of rollers 50 interposed between the two channels. As a result the blocks 27 with the cylinder 26 can move easily under the forme 14 when operated by the ram 28.

During the forward movement (from right to left in FIGURES 1 and 3), the cylinder 26 is prevented from turning, while during the return movement the cylinder is caused to rotate clockwise. This is achieved by a ring gear 51 on a sleeve 52 which is splined on the end of cylinder 26 so as to be capable of small axial travel. The sleeve 52 is formed with a circumferential slot in which is located a ring 53 having a pair of diametrically opposite, horizontally projecting pins 54. Each pin 54 is received in the forked end of an arm 55 and the other ends of the two arms 55 are welded to a sleeve 56 of square section, on a square section shaft 57 carried in end plates 58 and turned by a lever 60 at one end. Lever 60 is pivoted to a link 61 which in turn is pivoted to one arm 62 of a bell crank mounted on the shaft 63. The other arm 64 of the bell crank is pivoted to the piston rod 65 of a hydraulic ram 66.

When the ram 66 is in the retracted position shown, the gear 53 meshes with a rack 67 bolted to the side plate 29 and extending lengthwise thereof. If however the ram 66 is operated so that the piston rod is extended, the shaft 57 is turned through the linkage 60–64 and as a result the arms 55 turn clockwise as seen in FIGURE 4 and the ring 53 is moved axially to bring gear 51 out of mesh with rack 67 and into mesh with a fixed ring gear 68 secured to the block 27. The sleeve 56 is slidable on the shaft 57 so that the sleeve 52 can be moved axially when the cylinder 26 is at either end of its stroke. In practice, during the forward movement of the cylinder 26, the gear 51 meshes with gear 68 and the cylinder is thus prevented from turning. At the end of the forward stroke, the piston rod 65 is retracted to bring gear 51 into mesh with rack 67 so that, during the return stroke, the cylinder 26 rotates. At the end of the return stroke, the piston rod 65 is again extended to change back the gear 51.

The delivery support 34 may take any known form capable of feeding the cut blank from the surface of the support, when the cylinder 26, and the support 34, move rearwardly, i.e. from left to right in FIGURES 1 and 5 to 8. However it preferably consists of an arm 42 which is pivoted at one end and which normally is lifted clear of the surface of support 34 but, when the cylinder 26 concludes its forward movement, comes down and prevents rearward movement of the cut blanks with the delivery support 34; the cut blank is thus swept off support 34 into the hopper 35 as the support 34 moves rearwardly.

The operation of the cutting and creasing machine during one cycle thereof, will now be described with reference to FIGURES 5 to 8:

The cycle starts with the cylinder 26 at its rearmost position as shown in FIGURE 5. In this position the fingers 41 are uppermost and open, the pusher 32 is to the rear of the hopper 31 and a blank 43 is located on the feed support 33. The fingers 41 are closed automatically to grip the leading edge of the blank 43 and the cylinder starts its forward motion, without rotation; this forward motion constitutes the feed stroke, the blank 43 being merely drawn under the form as shown in FIGURES 6 and 7. At the same time the delivery support 34, carrying on it the cut and creased blank of the preceding cycle also moves forwardly to a position over the hopper 35 (FIGURE 6). Also the pusher 32 moves through the hopper 31 and feeds out the lowermost blank.

Having reached the end of its forward travel, the cylinder 26 starts its return or rearward motion, during which it turns clockwise as it moves as described above. During this motion, the blank cut on the preceding cycle is swept off support 34 into bin 35 as previously described. As the cylinder 26 moves rearwardly and rotates, the blank 43 is progressively forced against the forme 14 and is appropriately cut and creased by the blades 15, the bellows being meanwhile retracted. During the initial rotation of the cylinder, the leading edge of the blank 43 is still held by the fingers 41 and the waste material of the blank, which waste material is all connected to the leading edge, is progressively removed from the blank, leaving only the wanted material held between the blades 15 of the forme. When the cylinder 26 reaches the position shown in FIGURE 8, the fingers 41 are automatically opened to release the waste material which subsequently falls on to the waste conveyor 37 (FIGURE 1) and is deposited in the bin 36.

When the cylinder 26 returns to its starting position (FIGURE 4) the delivery support 34 is again located beneath the forme, and air under pressure is supplied to the bellows 24, causing those bellows to expand, as shown in FIGURE 5, and force the cut wanted material of the blank off the blades 15 so that it drops on to the support 34, for delivery to the bin 35 on the next cycle.

During the rearward or return movement of the cylinder 26, the feed support 33 moves backwardly under the blank fed out of the hopper 31 during the forward movement, and when the cylinder comes to rest, the fingers 41 are again located over the leading edge of the new blank ready to start the next cycle. The blank may be held against rearward movement with the support 33 by means of an arm similar to the arm 42 of the delivery support 34, or by any other convenient means.

While relatively stiff material, such as cardboard, is held securely between the blades 15 after cutting, thinner material may fall off the blades unless positive measures are taken to hold it. For this purpose the lower end of each bellows 24 may have a small perforation and suction may be applied to the bellows during the rearward motion of the cylinder 26. This suction applied through the retracted bellows is sufficient to hold the wanted material in place, while the perforations are insufficient to affect the ejection operation of the bellows at the end of the cycle.

It is to be understood that the ram 66, the fingers 41 and the blade 42 are operated automatically in timed relationship with the reciprocation of the cylinder 26 and the supply of air under pressure to the bellows. A timing mechanism of any known form is employed for this purpose.

It will be appreciated that, instead of ejection devices, such as the bellows 24, on the forme, suction devices may be carried on the delivery support 34 in order to suck the wanted material off the blades 15 at the end of the cutting operation. Also, the forcing of the blank against the forme may be performed by mechanisms other than the cylinder 26, as for example by a hinged platen.

I claim:

1. A cutting machine for sheet material comprising a stationary forme, a cylinder movable over the forme to roll the material on to the forme and cause cutting of the sheet material, means movable with the cylinder for removing waste material from the forme, the wanted material being retained on the forme, a delivery device for receiving the wanted material, and means for removing the wanted material from the forme and on to the delivery device, subsequent to the removal of the waste material.

2. A cutting machine according to claim 1 in which the means for removing waste material comprises fingers carried by the cylinder for gripping the waste material and for peeling the waste material off the forme as the cylinder rotates.

3. A cutting machine according to claim 2 in which the cylinder is mounted for reciprocating motion over the forme, the cylinder rotating only when moving in a first direction, and in which the cylinder fingers are arranged to grip and feed to the forme a sheet to be cut, each time it moves in a second direction.

4. A cutting machine according to claim 3 in which the cylinder carries a gear wheel which is alternatively engageable with a stationary gear to prevent rotation during movement in the second direction, and with a rack to cause rotation during movement in the first direction.

5. A cutting machine according to claim 4 in which the gear wheel is axially movable between positions in which it respectively meshes with the stationary gear and the rack.

6. A cutting machine according to claim 5, in which the gear wheel is shifted axially by arms secured to a sleeve slidable on a shaft which extends parallel to the movement of the cylinder and which is rotatable to cause shift of the gear wheel.

7. A cutting machine according to claim 3 in which the cylinder has a cut away section which is adjacent the forme during motion in the second direction, the surface of the cylinder being thereby spaced from the forme during that motion but being closely adjacent the forme for cutting when the cylinder rotates on movement in the first direction.

8. A cutting machine according to claim 7 in which the fingers are arranged in the cut-away sector.

9. A cutting machine according to claim 1 in which the forme carries ejector devices arranged at the location of the wanted material for ejecting the wanted material subsequent to the removal of the waste material.

10. A cutting machine according to claim 9 in which the ejector devices are pneumatically operated.

11. A cutting machine according to claim 10 in which each ejector device is a bellows connectable to a source of air under pressure.

12. A cutting machine according to claim 9 in which each ejector device is arranged to apply suction to the sheet material to retain the wanted material until ejection.

13. In a machine for cutting blanks from sheet material, said machine being of the type which comprises a holder for a supply of uncut sheets, a cutting forme, and a receiver for cut-out blanks, arranged successively along a path of travel, the improved means for progressing a sheet along said path of travel, pressing said sheet against said cutting forme to cut therefrom a desired blank, and stripping from said desired blank the portions of said sheet surplus to said blank, which means comprises a pressure member having an at least part-cylindrical surface having a generatrix parallel to said forme, means for reciprocating said pressure member between a first position on one side of said cutting forme adjacent said sheet holder and a second position on the other side of said cutting forme, gripping means carried by said pressure member adjacent said cylindrical surface for gripping one edge of a sheet when said pressure member is at said first position so that said sheet is drawn between said pressure member and cutting forme as said pressure member moves translationally from said first to said second position, and for retaining its grip on said sheet edge during at least part of the movement of said pressure member from said second position toward said first position, and means for causing said part-cylindrical surface to roll over said forme to press said sheet thereagainst so as to cut a blank from said sheet as said pressure member moves from said second to said first position, while simultaneously swinging said gripping means away from said forme to draw with it whatever portion of said sheet remains attached to said gripped edge.

14. A machine as claimed in claim 13 comprising means for opening said gripping means to receive a sheet when said pressure member reaches said first position and for reopening said gripping means to release said sheet during the return movement of said pressure member toward said first position.

References Cited by the Examiner

UNITED STATES PATENTS

| | | | |
|---|---|---|---|
| 1,605,816 | 11/26 | Dietrich | 83—23 |
| 1,963,902 | 6/34 | Hires | 83—23 |
| 2,501,835 | 3/50 | Barber | 83—154 |
| 2,659,437 | 11/53 | Huck | 83—154 |
| 2,737,238 | 3/56 | Rowlands | 83—510 X |
| 2,776,610 | 1/57 | Roselius | 93—58.2 |

FOREIGN PATENTS 1,044,583   11/58   Germany.

ANDREW R. JUHASZ, *Primary Examiner.*